A. BARTELS & O. MIECH.
AUTOMATIC CONVEYER OR FEEDING APPARATUS.
APPLICATION FILED APR. 23, 1913.
1,093,523. Patented Apr. 14, 1914.
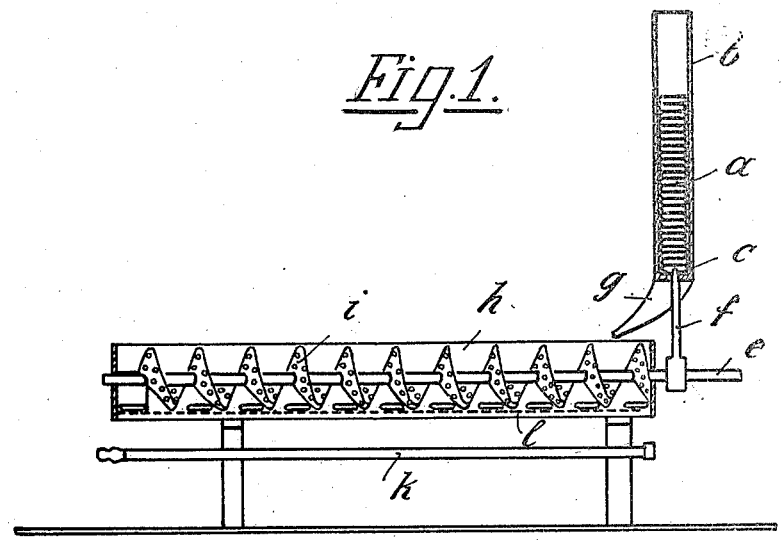
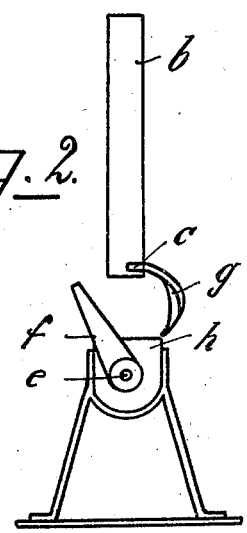

UNITED STATES PATENT OFFICE.

AMANDUS BARTELS AND OTTO MIECH, OF HARBURG-ON-THE-ELBE, GERMANY.

AUTOMATIC CONVEYER OR FEEDING APPARATUS.

1,093,523.  Specification of Letters Patent.  Patented Apr. 14, 1914.

Application filed April 23, 1913. Serial No. 763,046.

*To all whom it may concern:*

Be it known that we, AMANDUS BARTELS and OTTO MIECH, subjects of the King of Prussia, German Emperor, residing at Harburg-on-the-Elbe, Prussia, German Empire, have invented certain new and useful Improvements in Automatic Conveyers or Feeding Apparatus, of which the following is a specification.

This invention relates to improvements in means for automatically and uniformly feeding disks of vulcanite, celluloid or similar material to a conveyer, from which they are directed to other mechanism to be further treated.

The prime object of the present invention is to provide improved means for individually feeding the disks, the mechanism being so constructed and timed as to be operated upon each complete revolution of the conveyer.

The invention also comprehends improvements in the construction and arrangement of parts which will be hereinafter described and particularly pointed out in the claims.

In the drawings: Figure 1 is a vertical central section illustrating the application of our invention. Fig. 2 is an end view of the same. Fig. 3 is a detail bottom plan view of the feed hopper.

$b$ indicates a cylindrical hopper formed in its bottom with a transverse slot $d$, and in one wall with a horizontal slot $c$; the latter communicating with the slot $d$. Below the hopper is a trough $h$, having a perforated false bottom $l$. Operating in the trough is a screw conveyer $i$, mounted on a horizontal shaft $e$, supported in bearings formed in said trough. Fixed to the shaft $e$, is an arm $f$, which is of such length as to pass through the transverse slot $d$, as will be presently described. Extended from the bottom of the hopper $b$, to a point over the conveyer $i$, is an inclined chute $g$, which directs disks from the hopper to the conveyer.

In operation, disks indicated at $a$ are placed in the hopper $b$ and as the screw conveyer is rotated, the arm $f$ is also rotated. The end of the arm $f$ passes through the slot $d$ behind the lowermost disk and ejects the latter through the horizontal slot $c$, and onto the chute $g$ from whence said disk falls into the trough and is advanced along the false bottom. The conveyer gradually advances the disks along the false bottom, during which time they are subjected to heat, the latter being supplied by a burner $k$, located under the trough.

Obviously by the construction described, a disk will be fed upon the completion of each revolution of the conveyer, consequently an even distribution of the disks will at all times be insured.

We claim:

1. An apparatus of the class described comprising a conveyer including a rotary shaft, an arm fixed to and extending from said shaft, a feed chute located over the arm and with which the latter coöperates to eject a blank, and a guide from the feed chute to the conveyer.

2. An apparatus of the class described comprising a conveyer including a shaft, an arm extending from the shaft, a feed chute located in the path of movement of the arm and formed with a transverse and horizontal slot, the end of the arm passing through the transverse slot to eject a blank through the horizontal slot, and a guide extending from the feed chute to the conveyer to direct the blanks to the latter.

In testimony whereof we affix our signatures in presence of two witnesses.

DR. AMANDUS BARTELS.
OTTO MIECH.

Witnesses:
ERNEST H. L. MUMMENHOFF,
IDA CHRIST. HAFERMANN.